(No Model.)

E. P. PAYNTER, Jr.
UNION FOR STEAM PIPES.

No. 367,725. Patented Aug. 2, 1887.

WITNESSES
Will de Powell.
A. A. Connolly

INVENTOR
Edward P. Paynter Jr.
by Connolly Bros.
Atty's

UNITED STATES PATENT OFFICE.

EDWARD P. PAYNTER, JR., OF PHILADELPHIA, PENNSYLVANIA, ASSIGNOR OF ONE-HALF TO JOHN K. MOORE, OF SAME PLACE.

UNION FOR STEAM-PIPES.

SPECIFICATION forming part of Letters Patent No. 367,725, dated August 2, 1887.

Application filed April 24, 1886. Serial No. 200,042. (No model.)

*To all whom it may concern:*

Be it known that I, EDWARD P. PAYNTER, Jr., a citizen of the United States, residing at Philadelphia, in the county of Philadelphia and State of Pennsylvania, have invented certain new and useful Improvements in Unions for Steam-Pipes, &c.; and I do hereby declare the following to be a full, clear, and exact description of the invention, reference being had to the accompanying drawings, which form part of this specification, in which—

Figure 1:
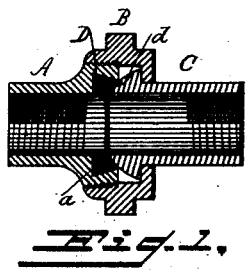
Figures 2, 3, 4:
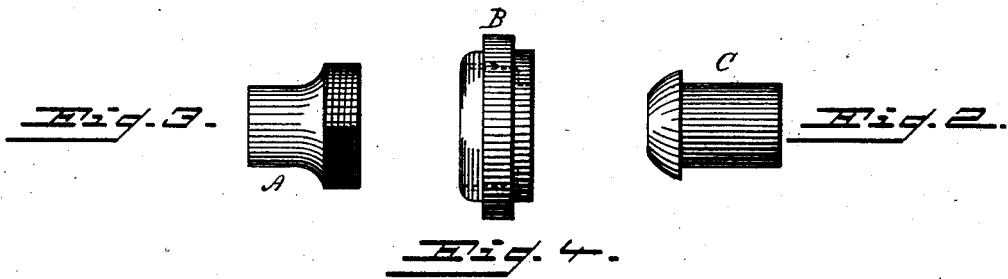

Figure 1 is a vertical longitudinal section of my invention. Fig. 2 is a side elevation of the male part of the union. Fig. 3 is a side elevation of the female part of the union. Fig. 4 is a side elevation of the nut which couples the male and female parts together.

My invention has for its object to provide a construction whereby the joint of the union of steam and other pipes will be made more tight than heretofore, and in which the danger of injury by indentation to the seat of such union when said seat is made of soft metal will be avoided.

My invention consists, essentially, in the construction of a union the female part of which is provided with a seat of soft metal or other soft material having a concave face or end, the male portion of the union having a convex end adapted and designed to rest upon or impinge against the soft seat of the female portion.

Unions have heretofore been constructed with soft seats which were flat, and against which the flat or straight end of the opposing part of the union pressed or was seated. With such a union it has been found that the soft seat was liable to become indented by the opposing part in case the fit was not exactly true, and it was difficult or impossible to remove such indentation, the latter impairing the efficiency of the joint.

In carrying my invention into effect I provide one of the members of the union with an internal seat of soft metal or other soft material, the face of which is made concave, and I form the opposing part of the union with a convex end, which bears upon or rests against the concave seat, forming a tight joint therewith. The soft metal or other soft material composing the seat is made in the form of a washer or ring, which is inserted in an interior annular beveled or undercut groove in the member of the union which receives it, said packing or ring being pressed into position by means of a drop-press, whereby it is expanded so that it cannot lose its position or come out. The convex end of the other member is ground so as to be perfectly true and concentric with the concave side, against which it rests or presses.

Referring to the accompanying drawings, A represents the female member, B the nut, and C the male member of a union, said nut coupling said male and female members, the nut and female member being threaded, as usual, to fasten them together, and the male member being formed with a shoulder, which abuts against the flange or end of the nut in the usual manner. The female member A is formed with an interior annular beveled groove, $a$, which receives a packing or ring, D, of soft metal or other soft material, capable of and suitable for use as a seat for a joint for a steam-pipe. This packing is in the first place made in the form of a washer or ring of such diameter that it may be dropped into the annular groove $a$, and after being placed in the latter is acted upon by a drop-press, which expands it so that it fills the groove $a$ and cannot come out of the latter. Any suitable soft metal or alloy capable of use as a packing for a steam-pipe joint may be employed for the purpose, and in lieu of soft metal any other equivalent soft material which may be properly used in the same situation may be employed. Said packing or washer is formed with a concave face or end, $d$, and the end of the male member C is rounded or made convex to conform to the concavity of the seat and to form a perfectly-tight joint therewith, said rounded or convex end being ground so as to be perfectly true and correct.

The concavo-convex character of the joint prevents the seat from being indented even if the two members of the coupling should not be exactly aligned, thereby avoiding the difficulty hitherto encountered with the flat soft-metal seats and straight ends of unions as heretofore constructed.

What I claim as my invention is—

1. A union for steam-pipes, comprising a threaded ring or nut, a member having a seat of soft metal with a concave face, and an opposing member with a rounded or convex end, substantially as shown and described.

2. The combination, in a union for steam-pipes, consisting of a threaded ring or nut and two members, of a member, A, having an interior annular groove, with a packing ring or washer of soft metal or other soft material fitted therein, said packing having a concave side or face, substantially as shown and described.

3. In a union for steam-pipes, a female member having an annular groove and expanded ring of soft metal therein with a concave seat or face, in combination with an opposing member having a convex or rounded ground end and a threaded ring or nut, substantially as shown and described.

In testimony that I claim the foregoing I have hereunto set my hand this 16th day of April, 1886.

EDWARD P. PAYNTER, Jr.

Witnesses:
 M. D. CONNOLLY,
 WILL H. POWELL.